W. A. EGGERS.
GAGE FOR SHEET METAL MACHINES.
APPLICATION FILED FEB. 28, 1919.
1,346,185.
Patented July 13, 1920.
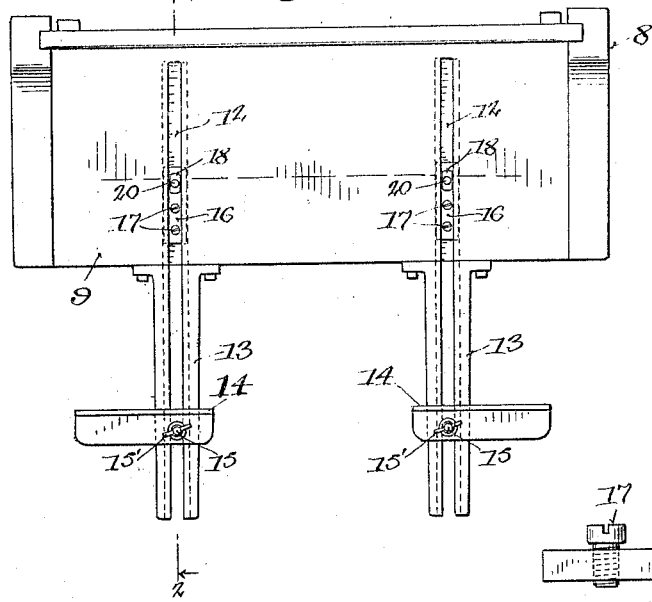
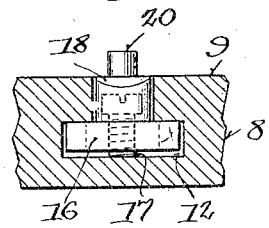
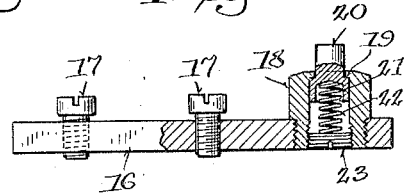
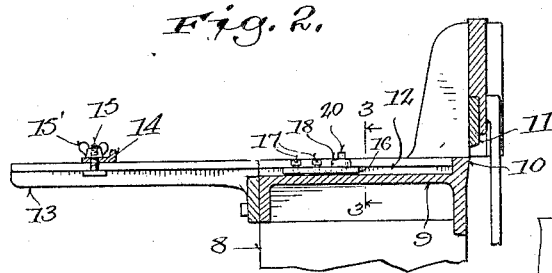
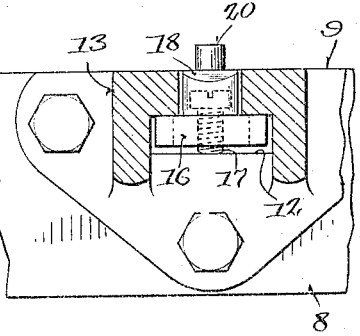
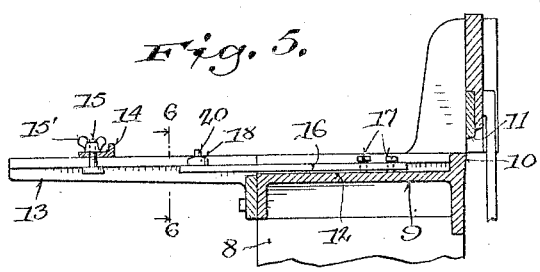
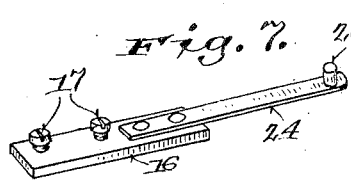
Inventor
William A. Eggers.
By Morsell & Keeney,
Attorneys.

UNITED STATES PATENT OFFICE.

WILLIAM A. EGGERS, OF MILWAUKEE, WISCONSIN.

GAGE FOR SHEET-METAL MACHINES.

1,346,185.  Specification of Letters Patent.  Patented July 13, 1920.

Application filed February 28, 1919. Serial No. 279,824.

*To all whom it may concern:*

Be it known that I, WILLIAM A. EGGERS, a citizen of the United States, and resident of Milwaukee, in the county of Milwaukee and State of Wisconsin, have invented new and useful Improvements in Gages for Sheet-Metal Machines, of which the following is a description, reference being had to the accompanying drawings, which are a part of this specification.

This invention relates to improvements in gages for sheet-metal shearing machines.

Sheet-metal shearing machines as now constructed consist of a table portion provided with guides which are adjustably positioned and spaced from the cutting knife to gage the size of the material to be cut, and in cutting material the sheet metal is extended through between the shearing knives with one edge of the sheet material bearing against the gage, and the material is then cut. In the event that a great number of sheets of metal are to be cut, it is customary to adjust the gage for the first cut, and cut all of the sheets a certain size.

After these have been cut, the gage is then adjusted for the second cut, and the sheets of metal are then turned one-quarter around edgewise, and placed against the gages, and the second cut is then made. These operations necessarily require the rehandling of the sheet metal a number of times.

Furthermore, if it is desired to cut a few sheets at a time, the gages necessarily have to be changed to make the different cuts, which requires considerable time in order to accurately adjust the gages, and when again cutting a few parts, it is somewhat difficult to adjust the gages to the exact dimensions of the former cut.

It is one of the objects of the present invention to overcome the aforementioned objectionable features, and provide a gage or stop for sheet metal cutting machines which will enable both cuts of sheet metal to be made with one handling of the sheet, thus expediting the work, and conducing to more accuracy in the product.

A further object of the invention is to provide a gage for shearing machines in which a yieldable stop gage member is provided which may be adjustably fastened in the grooved guideways of the shearing machine, and which will be depressed below the upper surface of the table when making one cut of the sheet metal.

A further object of the invention is to provide a shearing machine gage or stop of the yieldable type, which may be mounted in the grooved guideways of the machine in such a manner as to permit the yieldable gage or stop portion to be positioned outwardly beyond the bed or table of the machine to provide for gaging and cutting large pieces of material.

A further object of the invention is to provide a shearing machine gage or stop which is of simple construction, is strong and durable, and is well adapted for the purpose described.

With the above and other objects in view, the invention consists of the improved sheet-metal gage or stop, and its parts and combinations as set forth in the claims, and all equivalents thereof.

Referring to the drawing, in which the same reference numerals indicate the same parts in all of the views:

Figure 1 is a top view of a shearing machine provided with the improved gages or stops;

Fig. 2 is a transverse sectional view thereof taken on line 2—2 of Fig. 1;

Fig. 3 is a sectional detail view on a larger scale taken on line 3—3 of Fig. 2;

Fig. 4 is an enlarged side view of the gage member, portions being shown in section to illustrate the interior construction;

Fig. 5 is a transverse sectional view of a portion of the shearing machine showing a slightly modified form of gage or stop mounted thereon;

Fig. 6 is a transverse sectional detail view thereof, on a larger scale, taken on line 6—6 of Fig. 5; and Fig. 7 is a perspective view of another modified form of gage or stop.

Referring to the drawing, the numeral 8 indicates a shearing machine of ordinary type, which is provided with a bed plate or table 9, a fixed shearing member 10, a movable shearing member 11, and gage guideways or grooves 12. These guideways are usually of T formation in cross-section, and are located in the upper portion of the table and extend from a position close to the knives transversely to the opposite edges of the table.

Machines of this type are also usually provided with extension guides 13, which are bolted to the side edge portions of the machine, and extend horizontally outwardly therefrom and form a continuation of the grooved guideways to permit the handling of sheets of material to be cut of larger area than the size of the table top. The gage as customarily provided with the shearing machines consist of straight guide members 14 provided with threaded clamping members or screws 15 which enter the guide grooves, and the guide member is clamped in adjusted position to the table top of the guide extensions by means of thumb-nuts 15' which are threaded on the clamping members.

As before described, this guide member is adjusted to make the first cut, and after the first cut has been made, it is again adjusted for the second cut, in order to provide a rectangular piece of sheet metal of predetermined size.

All of the parts thus described relate to the ordinary shearing machine.

The improved gage or stop member comprises a holding stop member 16 of elongated shape and rectangular in cross section, which is of a size to loosely fit in the lower T-head portion of the guideways 12. The holding member is provided with one or more clamping screws 17 which are threaded vertically through the holding member, and the lower end or ends of these screws are adapted to impinge against the bottom portion of the guide grooves, and securely clamp the holding member in adjusted position.

Extending upwardly from the holding member is a tubular portion 18 which is of a size or diameter to fit within the upper or more narrow portion of the groove ways 12. This tubular portion is preferably threaded to the holding member, and its upper end terminates at a point either flush or a slight distance below the plane of the upper surface of the table. This tubular portion is of slightly less diameter than the other portion to form an annular shoulder 19.

Within the tubular member is fastened a gage or stop pin 20 which at its lower end portion 21 is of slightly larger diameter to form a head to limit the outward movement of said stop member. The lower end portion of this stop member is recessed to receive the upper end portion of a coiled spring positioned within the tubular member for holding the stop member yieldingly in its upper position. A screw 23 threaded into the lower portion of the tubular member maintains the spring within the tubular member.

The gage member normally projects a short distance above the upper surface of the table top when the improved gage is mounted thereon, in order to serve as a gage or stop in the same manner as the guide bar 14 in cutting the sheet metal.

The holding member 16 may be made of any length desired, whereas, when used directly upon the table may be quite short, as shown in Fig. 4, but when it is desired to cut sheets of metal of larger size than the table top, it is necessary to have longer holding members in order to extend the yielding stop gage portion 20 at a point beyond the table top, as illustrated in Fig. 5.

In some forms of shearing machines, the extension guides 13 are provided with bottom portions of the grooved guideways, and in which event the short holding members may be used, but in the form shown in the drawing, the guideway portions of the extensions are open, and therefore it is necessary to provide elongated holding members so that the clamping screws 17 can impinge against the bottom portions of the guideways or the table.

In the form shown in Fig. 7, a flat yielding member 24 is provided in lieu of the tubular part and coiled spring construction, and to the free end of this flat spring an upwardly projecting gage or guide pin member 20' is connected. This guide pin 20' is adapted to project upwardly a short distance above the upper surface of the table or extensions of the shearing machine, and operates in the same manner as the first described form.

In operation, the improved gage members are clamped in adjusted position within the grooved guideways, as indicated in Fig. 1, and are preferably positioned to form the second cut of the sheet metal. The ordinary guide bars are also adjusted to cut the sheet material the longer way. When thus adjusted the sheet metal is placed on the table top with its rear edge bearing against the ordinary guide bars, and its front edge between the shearing knives. The weight of sheet metal bearing on top of the gage pins of the improved type will force said members downwardly to a position flush with the upper surface of the table top, or the operator may press downwardly on the sheet metal to force the members downwardly. When thus positioned the machine is operated to shear the metal, and the sheet metal is then turned one-quarter way around edgewise to make the second cut, and in making the second cut the rear edge of the metal will then be positioned against the projecting stop gages of the holding members, as said stop gages will immediately spring upwardly in position to be engaged as soon as relieved from the weight of the sheet metal. It will be noted that the guide bars are separated to permit the operator to pass therebetween and get close to the work.

It will thus be seen that by means of these improved gages or guides a sheet of metal may be cut on different edges to different dimensions without removing the metal from the shearing machine, and without readjusting the guides or gages.

While the improved gage has been described and shown in connection with a sheet metal shearing machine, it is to be understood that the gage is also adapted to be used for cutting other material than sheet metal.

From the foregoing description it will be seen that the sheet metal gage or guide is of very simple construction, and is well adapted for the purpose described.

What I claim as my invention is:

1. The combination with a shearing machine having a table portion provided with T-shaped grooved ways extending at right angles to the line of cut of the machine, of a stop guide therefor comprising a holding member of T-shape in cross section, means for adjustably mounting the holding member within one of the grooved ways and below the upper surface of the table portion, said holding member being adjustable toward and away from the line of cut, and a yielding gage stop member carried by the holding member and normally projecting above the upper surface of the table portion.

2. A gage device, comprising a holding member, means for connecting said member to a support, a tubular member threaded into the holding member and extending upwardly therefrom, a guide pin projecting yieldingly outwardly from the holding member, and a coiled spring for holding the guide pin in its outer position.

3. A gage device, comprising a holding member, a clamping screw extending therethrough, a tubular shouldered member threaded into the holding member and extending upwardly therefrom, a shouldered guide pin extending into the tubular member and engaging the shoulder thereof and projecting outwardly therefrom, a coiled spring within the tubular member and engaging the pin, and means for holding the spring in position.

In testimony whereof, I affix my signature.

WILLIAM A. EGGERS.